May 2, 1961  R. C. STANHOPE  2,982,057
SPHERICAL GRINDING MACHINE AND METHOD
Filed Aug. 26, 1957
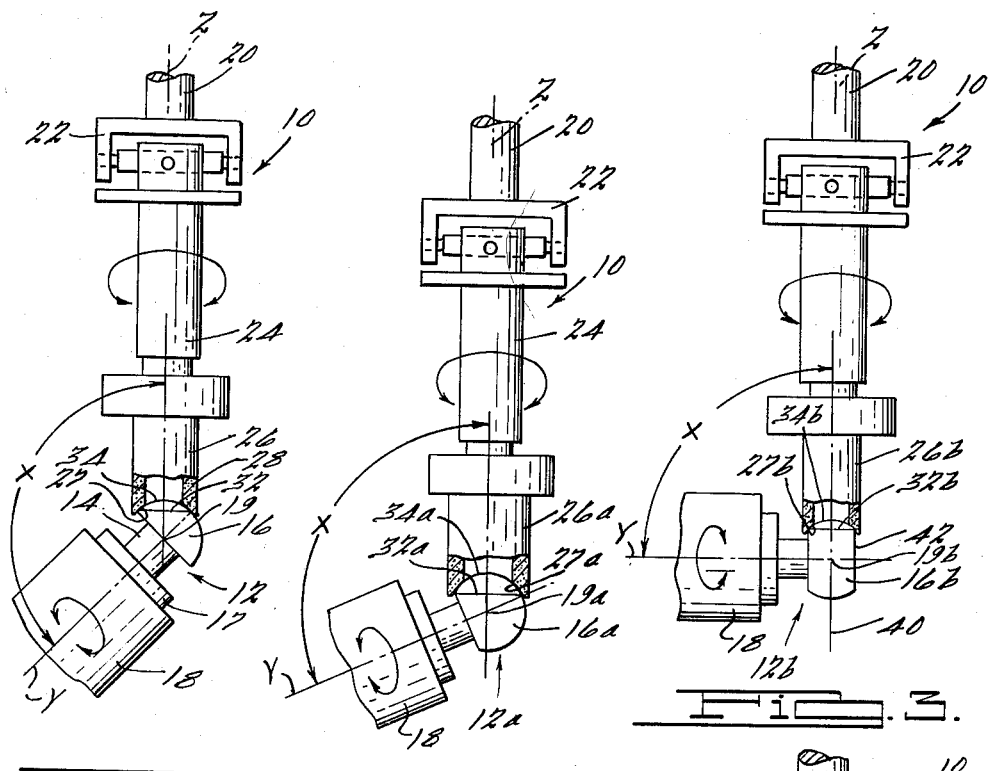
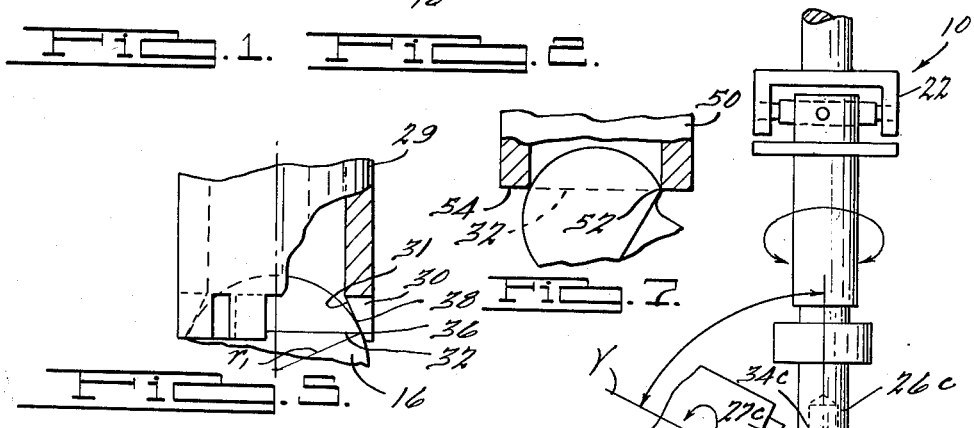
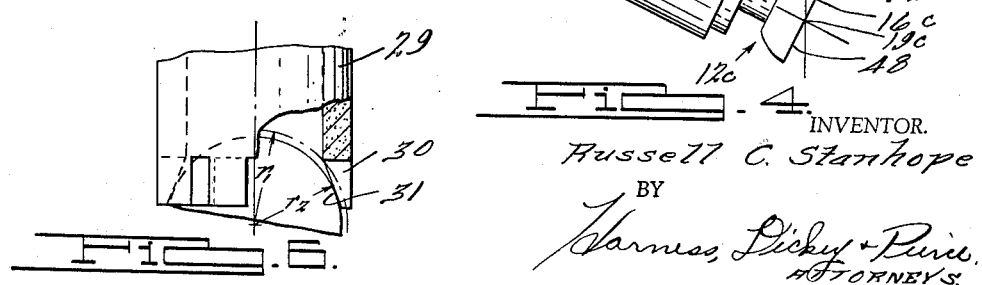
INVENTOR.
Russell C. Stanhope
BY
Harness, Dickey & Pierce
ATTORNEYS

United States Patent Office 2,982,057
Patented May 2, 1961

2,982,057

SPHERICAL GRINDING MACHINE AND METHOD

Russell C. Stanhope, Bloomfield Hills, Mich., assignor to Micromatic Hone Corporation, a corporation of Michigan Filed Aug. 26, 1957, Ser. No. 680,294

3 Claims. (Cl. 51—73)

This invention relates generally to grinding and honing machines and more particularly to a method and apparatus for generating portions of true spherical surfaces on workpieces.

In this invention a simple apparatus and method are provided for generating precise spherical shaped surfaces on frusto-spherical members. As used herein, the term "frusto-spherical" describes a portion of a full sphere which is interrupted or terminated at one or both of its ends by a non-spherical surface and is illustrated by any of the workpiece shapes shown in Figs. 1–4, inclusive. A tubular grinding tool has workpiece engaging grinding or cutting surfaces arranged in a circular path at one end of the tool and inclined outwardly relative to the axis of the tool. The tool is related to a workpiece such that these surfaces engage the workpiece at positions opposite the ends of a chord which subtends a surface arc for the final workpiece shape, with this arc being in a plane which includes the longitudinal axis of the workpiece and extending between the ends of the workpiece. When the tool is thus applied to the workpiece, rotary motion of the tool generates a circle in the plane of the contacting tool and workpiece portions, namely, in the plane of the above mentioned chord. By also rotating the workpiece, preferably in a direction counter to the direction of rotation of the tool, a series of such chordal circles are distributed about the periphery of the workpiece, thus describing a frusto-spherical surface on the workpiece.

The main object of this invention, therefore, is to provide an improved method and apparatus for generating portions of true spherical surfaces on workpieces.

A further object of this invention is to provide a method and apparatus for generating portions of true spherical surfaces on workpieces which requires only a pair of rotary motions, one for the workpiece and one for the tool.

Another object of this invention is to provide apparatus of the above type which is simple in construction, economical to assemble and operate, and efficient in operation in forming the desired spherical surfaces.

Further objects, features and advantages of this invention will become apparent from a consideration of the following description, the appended claims and the accompanying drawing in which:

Fig. 1 is an elevational view of a honing machine of this invention, illustrated in assembly relation with a workpiece of a first frusto-spherical shape;

Figs. 2, 3 and 4 are elevational views like Fig. 1 showing the apparatus of this invention adapted for workpieces of different frusto-spherical shapes;

Fig. 5 is a fragmentary elevational view of the end portion of a grinding tool for the apparatus of this invention, showing the tool in an initially assembled position with a portion of a workpiece to be ground to a frusto-spherical shape, with some parts broken away and other parts shown in section for the purpose of clarity;

Fig. 6 is a fragmentary elevational view, illustrated similarly to Fig. 5, showing the final shape of the workpiece in solid lines and illustrating the initial shape of the workpiece in broken lines; and Fig. 7 is a fragmentary elevational view of the end portion of another grinding tool usable in the apparatus of the invention.

With reference to the drawing, the apparatus of this invention, indicated generally at 10, is illustrated in Fig. 1 in working relation with a workpiece 12 having a shank 14 and a head 16. The shank 14 is held in a collet 17 carried by a spindle 18 mounted for rotation in any suitable manner about the longitudinal axis Y of the workpiece 12.

The apparatus 10 includes a spindle 20 connected by a universal joint type coupling 22 to a tool holder 24 for a tool 26. The spindle 20 is operable through the coupling 22 to rotate the tool 26 about its axis Z, with the coupling 22 allowing the tool to adjust itself relative to the workpiece. As best appears in Fig. 1, the tool 26 consists of a hollow cylindrical body member 28 formed of an abrasive material. At its working end the tool 26 is formed with a concave end surface 27. By virtue of the engagement of the surface 27 with spherically shaped workpieces, the surface 27 is soon worn to a similar spherical shape.

In the use of the apparatus 10 to form the minor spherical segment illustrated for the head 16 in Fig. 1, the axes Y and Z are relatively inclined at an angle indicated at X, such that the axis Z bisects the chord 32 which subtends the arc 34. This arc 34 represents one-half of the surface of the head 16 on one side of and in a plane common to the axis Y. In addition, the tool 26 is positioned so that the chord 32 is between opposite portions of the end surface 27. With the tool in this position the axes Y and Z intersect at a point 19 which constitutes the center of the spherically shaped portion of the workpiece.

The apparatus 10 is illustrated in Fig. 2 provided with a tool 26a similar to but larger in diameter than the tool 26 previously described. The tool 26a is of a size to adapt the apparatus 10 for forming a head 16a, which is a major spherical segment, on a workpiece 12a which has a chord 32a larger than the corresponding chord 32 illustrated in Fig. 1. The chord 32a subtends an arc 34a which extends over one-half of the surface of the head 16a in the plane of the axis Y. The tool 26a is of a size such that the chord 32a is movable to a position between diametrically opposite portions of the concave end surface 27a in the same manner previously described for the head 16 on connection with the tool 26. The operation of the apparatus 10 in connection with the tool 26a and the workpiece 12a is identical in all respects to that previously described for the workpiece 12.

In Fig. 3, the apparatus 10 is shown provided with a tool 26b of a size to adapt the apparatus 10 for forming a head 16b which is a spherical zone between two substantially parallel planes and is symmetrical about an axis 40 extending transversely thereof. The head 16b has a planar surface 42 extending transversely of the head at the outer end thereof. The tool 26b is of a size such that diametrically opposite portions are movable to positions at opposite ends of a chord 32b which subtends a surface arc 34b in the manner previously described. It is to be noted that the arc 34b also represents one-half of the outer surface of the head 16b in a plane which includes the workpiece axis Y.

In Fig. 4, the apparatus 10 is illustrated in connection with a head 16c on a workpiece 12c which has a planar surface 48 at its outer end. The head 16c is of a nonsymmetrical spherical zone shape and has its spherically shaped surface curving inwardly from the surface 48 in a direction toward the workpiece axis Y. The tool 26c is likewise of a size to receive the chord 32c between the opposite surface portions thereof.

When the spherical surface of the workpiece is continuous in a direction transversely of the head, as illustrated for the workpieces 12 and 12a, the angle X is an obtuse angle. Also, the chord 32 intersects the axis Y at the terminal end of the workpiece. When this surface is interrupted as by the planar surfaces 42 and 48 illustrated in Figs. 3 and 4, respectively, the angle X is either a right angle, in the case of a symmetrical head like the one shown in Fig. 3, or an acute (Fig. 4) or obtuse angle, depending on the direction of curvature of the head surface. In such cases the chord, like the chord 32c is spaced from the axis Y at the terminal end of the workpiece.

A tooth type cutter tool 29 for the apparatus 10 is illustrated in Figs. 5 and 6 as including a hollow cylindrical body formed at one end with spaced teeth 30 having inwardly inclined inner working surfaces 31. In the use of the tool 29, which is preferably formed of a suitable cutting tool metal such as tungsten carbide or a grid consisting of a hard cutting material such as diamonds or an aluminum oxide or the like, disposed in a binder or bonding material such as metal ceramic oxide or the like, assume that the desired final radius for the head 16 is represented at $r_2$. The initial radius of the head 16, whicht is usually formed by forging and is only slightly larger than the desired final size, is represented at $r_1$. The tool 29 is of a diameter such that the working surfaces 31 of the teeth 30 are tangent to the surface of the head 16 at points 36 outwardly of the approximate center 38 of each surface 31. As a result, the head 16 is initially machined only by the outer end portions of the teeth 30 and, as the head 16 is reduced in size, portions of the surfaces 31 inwardly of the outer end portions engage the workpiece.

When the teeth 30 initially contact the surface of the head 16, the teeth surfaces 31 are tangent to the surface of the head 16 at the points 36. If the tool 29 is rotated and the workpiece and tool relatively moved toward each other, a chordal conical zone between the points 36 and 38 is formed about the workpiece head 16. By also rotating the workpiece 12 on its axis Y, while so feeding the tool 29 and the workpiece 12 toward each other along the axis Z of the tool 29, this generation of chordal zones is distributed about the periphery of the workpiece to form the workpiece with a surface of a spherical shape.

In Fig. 7 another tool 50 is illustrated which is also usable in the apparatus 10. The tool 50 consists of a hollow cylindrical body, formed of any of the materials previously specified for the tool 29, having a sharp inner circular edge 52 at the working end 54 of the body. The tool 50 is used like the tools 26 and 29, namely, rotated in engagement with a head 16 until the head has been shaped to a size in which the chord 32 extends between diametrically opposite portions of the edge 52. The edge 52 is the only part of the tool 50 which contacts the workpiece and this edge scrapes material from the workpiece in filament form. This process is known as shaving and is more recently referred to as "skiving."

The coupling 22 in all cases is of the angularly free type to permit the recessed end of the tool to center itself with respect to the workpiece surface. This centering insures a position of the rotary axis of the tool intersecting the spherical center of the workpiece. This arrangement is essential since it is necessary that the sphere be generated about the common center of the axes Y and Z in order that a truly spherical surface may result from the overlapping spherical segments thus obtained.

It is to be noted that in the case of all the head shapes illustrated at 16, 16a, 16b and 16c, a plane passing through the workpiece axis Y intersects equal arcs indicated at 34, 34a, 34b and 34c, respectively. The tool 26 is arranged in each case so that the axis Z therefor bisects the chord 32, 32a, 32b or 32c for the corresponding arc 34, 34a, 34b or 34c which in each case extends between the ends of the body member head.

From the above description, it is seen that this invention provides honing apparatus 10 which is assembled in a predetermined manner with the workpieces 12, 12a, 12b and 12c, so that only rotary motions of the tool and the workpiece are required to obtain the desired formation of the frusto-spherical heads 16, 16a, 16b and 16c. It is only necessary that the tool be arranged so that the tool axis Z bisects the chord 32, 32a, 32b or 32c, with the tool teeth on opposite sides of the chord. With this arrangement, the tool axis Z intersects the workpiece axis Y at the center 19, 19a, 19b or 19c, of the spherically shaped portion of each of the workpieces 12, 12a, 12b or 12c in each case. By this process the forged workpieces, which usually have a surface hardness of about 36 to 38 Brinell, are readily ground to the shape of a segment or zone of a sphere to an accuracy of about two thousandths. This final two thousandths is then readily removed by a honing process so that an exact shape can be used in a ball joint or the like.

Although the invention has been described with respect to several embodiments thereof, it is to be understood that it is not to be so limited, since changes can be made therein which are within the scope of the invention as defined by the appended claims.

What is claimed is:

1. Apparatus for forming an end portion of a workpiece of a frusto-spherical shape, said shape being such that a plane through the longitudinal axis of the workpiece extends between a pair of equal arcs located on the surface of said end portion and disposed on opposite sides of said axis, said apparatus comprising a tool mounted for rotation about an axis and for automatic lateral shifting relative thereto to permit said tool to intersect said longitudinal axis when bisecting the chord which subtends one of said arcs, said tool having a pair of cutting surfaces spaced apart a distance such that portions of said surfaces are engageable with said end portion at opposite ends of said chord, means for rotating said tool, and means for rotating said workpiece.

2. The method of forming a workpiece end portion of a frusto-spherical shape using a tool provided with oppositely disposed grinding portions, said method comprising the steps of; arranging said tool so that said grinding portions engage said workpiece portion at the ends thereof, floating said tool so that it may automatically shift to permit an axis midway between said grinding portions to intersect the longitudinal axis of the workpiece, rotating said tool about said midway axis, and concurrently rotating said workpiece about said longitudinal axis.

3. The method of forming a workpiece having a longitudinal axis with a frusto-spherically shaped end portion by means of a tool having oppositely disposed cutting surfaces, and wherein portions of said surfaces are spaced apart distances substantially equal to the length of a chord which subtends the longest arc on the surface of said workpiece end portion on one side of said axis and which arc also lies in a plane which includes said axis, said method comprising the steps of; arranging said tool so that said surfaces are engageable with said workpiece portion at a position such that said chord is between said surfaces, mounting said tool for angular rotation and for automatic lateral shifting into cutting position, rotating said tool about an axis midway between said surfaces, and concurrently rotating said workpiece about said longitudinal axis.

References Cited in the file of this patent

UNITED STATES PATENTS

| | | |
|---|---|---|
| 1,604,517 | Jolls | Oct. 26, 1926 |
| 1,994,529 | Meyer | Mar. 19, 1935 |
| 2,238,326 | Indge | Apr. 15, 1941 |
| 2,600,815 | Turner | June 17, 1952 |
| 2,643,815 | Burroughs | June 30, 1953 |
| 2,836,939 | White | June 3, 1958 |
| 2,847,881 | Allemann | Aug. 19, 1958 |

UNITED STATES PATENT OFFICE
CERTIFICATE OF CORRECTION

Patent No. 2,982,057                      May 2, 1961

Russell C. Stanhope

It is hereby certified that error appears in the above numbered patent requiring correction and that the said Letters Patent should read as corrected below.

Column 4, line 53, for "whereiu" read -- wherein --; line 73, for "2,643,815" read -- 2,643,492 --.

Signed and sealed this 24th day of October 1961.

(SEAL)
Attest:

ERNEST W. SWIDER                      DAVID L. LADD
Attesting Officer                      Commissioner of Patents

USCOMM-DC